(12) United States Patent
Xi et al.

(10) Patent No.: US 11,150,661 B2
(45) Date of Patent: Oct. 19, 2021

(54) SCOOTER HAVING A CONTRACTING STEERING HANDLE FOR UNMANNED OPERATION

(71) Applicant: Ninebot (Beijing) Tech Co., Ltd., Beijing (CN)

(72) Inventors: Weining Xi, Beijing (CN); Zichong Chen, Beijing (CN); Yubin Yuan, Beijing (CN); Zhongyuan Chen, Beijing (CN); Dongyan Zhai, Beijing (CN)

(73) Assignee: Ninebot (Beijing) Tech Co., Ltd., Beijing (CN)

( * ) Notice: Subject to any disclaimer, the term of this patent is extended or adjusted under 35 U.S.C. 154(b) by 262 days.

(21) Appl. No.: 16/403,556

(22) Filed: May 5, 2019

(65) Prior Publication Data

US 2020/0183403 A1    Jun. 11, 2020

(30) Foreign Application Priority Data

Dec. 7, 2018  (CN) .......................... 201811498118.6

(51) Int. Cl.
| | |
|---|---|
| *B62J 45/422* | (2020.01) |
| *B62K 3/00* | (2006.01) |
| *G05D 1/02* | (2020.01) |
| *B62K 17/00* | (2006.01) |
| *B62J 45/40* | (2020.01) |
| *B62K 5/02* | (2013.01) |

(52) U.S. Cl.
CPC .......... *G05D 1/0214* (2013.01); *B62J 45/422* (2020.02); *B62K 17/00* (2013.01); *G05D 1/0253* (2013.01); *B62J 45/40* (2020.02); *B62K 5/02* (2013.01)

(58) Field of Classification Search
None
See application file for complete search history.

(56) References Cited

U.S. PATENT DOCUMENTS

| | | | |
|---|---|---|---|
| 2010/0005636 A1* | 1/2010 | Liao | A42B 3/04 24/652 |
| 2016/0067588 A1 | 3/2016 | Tan et al. | |
| 2017/0190335 A1* | 7/2017 | Gillett | B62K 11/02 |

FOREIGN PATENT DOCUMENTS

| | | |
|---|---|---|
| CN | 205417967 U | 8/2016 |
| CN | 205737878 U | 11/2016 |
| CN | 106476954 A | 3/2017 |
| CN | 106542029 A | 3/2017 |
| CN | 106672140 A | 5/2017 |
| CN | 107336697 A | 11/2017 |
| CN | 206679116 U | 11/2017 |
| CN | 108407957 A | 8/2018 |

(Continued)

OTHER PUBLICATIONS

The extended European search report for the EP patent application No. 19170606.8, dated Oct. 15, 2019.

*Primary Examiner* — Todd Melton
(74) *Attorney, Agent, or Firm* — Gang Yu

(57) ABSTRACT

The present disclosure provides a scooter. The scooter includes a scooter body and a photographing portion; the photographing portion is mounted on the scooter body; and the scooter body is provided with an avoidance space for avoiding a photographing view angle of the photographing portion, so that the photographing portion photographs a road condition around the scooter body.

16 Claims, 2 Drawing Sheets

(56) References Cited

FOREIGN PATENT DOCUMENTS

| | | | |
|---|---|---|---|
| CN | 108639207 | A | 10/2018 |
| CN | 108674560 | A | 10/2018 |
| CN | 108693884 | A | 10/2018 |
| DE | 102009059849 | A1 | 7/2011 |
| DE | 102012220011 | A1 | 5/2014 |
| DE | 102016119729 | A1 | 4/2018 |
| JP | S5155779 | U | 4/1976 |
| JP | 2007124866 | A | 5/2007 |
| JP | 2007161198 | A | 6/2007 |
| JP | 3174087 | U | 3/2012 |
| JP | 2017091284 | A | 5/2017 |
| KR | 20140108511 | A | 9/2014 |
| WO | 2017217936 | A1 | 12/2017 |

\* cited by examiner

SCOOTER HAVING A CONTRACTING STEERING HANDLE FOR UNMANNED OPERATION

TECHNICAL FIELD

The present disclosure relates to a technical field of sensor controlled vehicle devices, and in particular to a scooter.

BACKGROUND

In the related art, a photographing portion of an automatic driving scooter only can photograph a single direction of the scooter such as an advancing direction or a pre-driving direction, and cannot photograph a surrounding environment of the scooter at a wide angle, so that a surrounding driving road condition cannot be mastered accurately and a potential safety hazard is caused to the driving of the scooter.

SUMMARY

An embodiment of the present disclosure is mainly intended to provide a scooter to solve the problem that an automatic driving scooter cannot observe a surrounding environment simultaneously in the related art.

To this end, an embodiment of the present disclosure provides a scooter, which includes: a scooter body; and a photographing portion; wherein the photographing portion is mounted on the scooter body; and the scooter body is provided with an avoidance space for avoiding a photographing view angle of the photographing portion, so that the photographing portion photographs a road condition around the scooter body.

In an exemplary embodiment, the scooter further includes: a driving portion, the driving portion being connected with the scooter body; a wheel portion, at least part of wheel portion being movably connected with the driving portion; and a control portion, the control portion being connected with the scooter body, the control portion being electrically connected with the photographing portion and the driving portion, and the control portion controlling the driving portion through an image signal collected by the photographing portion to act, thereby driving the at least part of the wheel portion to drive the scooter body to move and avoid an obstacle.

In an exemplary embodiment, the scooter further includes: a sliding plate; a scooter rod portion, the scooter rod portion being rotatablely connected with the sliding plate, and a first end of the scooter rod portion being connected with the driving portion; and a handle portion, the handle portion being connected with a second end of the scooter rod portion, the handle portion being connected with the photographing portion, and the avoidance space being formed between the handle portion and the second end of the scooter rod portion.

In an exemplary embodiment, the handle portion includes: a handle rod, the handle rod being connected with the photographing portion; a first connection end, a first end of the first connection rod being connected with the handle rod, and a second end of the first connection rod being connected with the second end of the scooter rod portion; and a second connection rod, a first end of the second connection rod being connected with the handle rod, a second end of the second connection rod being connected with the second end of the scooter rod portion, the first end of the first connection rod and the first end of the second connection rod being provided at intervals, and the handle rod, the first connection rod and the second connection rod being enclosed to form the avoidance space.

In an exemplary embodiment, the handle portion further includes: a mounting foundation, wherein the mounting foundation is provided with a mounting plane; the mounting foundation is connected with the handle rod and is located between the first connection rod and the second connection rod; the photographing portion is detachably disposed on the mounting plane.

In an exemplary embodiment, the mounting plane is disposed at a preset angle with a horizontal plane.

In an exemplary embodiment, the photographing portion is a wide-angle photographing device.

In an exemplary embodiment, the scooter rod portion includes: a first scooter rod, a first end of the first scooter rod being connected with the scooter body, a second end of the first scooter rod being provided with an opening, and the opening extending along a length direction of the first scooter rod to form an accommodation cavity; and a second scooter rod, a first end of the second scooter rod being movably disposed in the accommodation cavity, a second end of the second scooter rod being connected with the scooter handle portion, and the avoidance space being formed between the second end of the second scooter body and the scooter rod portion.

In an exemplary embodiment, at least one of the first scooter rod and the second scooter rod is provided with a distance sensor; the distance sensor is electrically connected with the control portion; the second scooter rod is provided with a contraction portion located in the accommodation cavity and an extension position located out of the accommodation cavity; when the distance sensor detects that the second scooter rod is located at the contraction position, the control portion controls the driving portion through the image signal collected by the photographing portion to act; and when the distance sensor detects that the second scooter rod is located at the extension portion, the control portion controls the photographing portion to stop work.

In an exemplary embodiment, the scooter includes: an alarm portion; wherein the alarm portion is connected with the scooter body; and the alarm portion is electrically connected with the control portion.

In an exemplary embodiment, the scooter further includes: a driving portion; a wheel portion, the driving portion being drivablely connected with and the wheel portion, thereby driving the wheel portion to rotate around an axial line of a wheel spindle of the wheel portion and/or driving the wheel portion to perform a steering motion; and a control portion, the control portion being connected with the scooter body, the control portion being electrically connected with the photographing portion and the driving portion, and the control portion controlling the driving portion through an image signal collected by the photographing portion to act, thereby driving at least one part of the wheel portion to drive the scooter body to move and avoid an obstacle.

In an exemplary embodiment, the driving portion includes: a first driving portion, wherein the first driving portion is disposed an inner side of the wheel portion; and the first driving portion is connected with the wheel spindle of the wheel portion, thereby driving the wheel portion to rotate around the axial line of the wheel spindle.

In an exemplary embodiment, the scooter body further includes a mounting frame; the wheel portion is rotatablely mounted on the mounting frame; the driving portion includes: a second driving portion, wherein the second driving portion is in driving connection with the mounting frame to drive the mounting frame to rotate, so that the mounting frame drives the wheel portion to steer.

In an exemplary embodiment, the second driving portion is provided with a driving wheel; a driven wheel is disposed on the mounting frame; and a transmission belt is provided on the driving wheel and the driven wheel in a sleeve manner, so that the driving wheel drives the driven wheel to rotate and thus the mounting frame is rotated.

In an exemplary embodiment, the scooter body includes: a sliding plate; a scooter rod portion, the scooter rod portion being rotatablely disposed relative to the sliding plate, and a first end of the scooter rod portion being connected with the mounting frame, so that when the second driving portion is in a nonworking state, the wheel portion is steered by operating the scooter rod portion; and a handle portion, the handle portion being connected with a second end of the scooter rod portion, and the photographing portion being mounted on the handle portion.

In an exemplary embodiment, the handle portion includes: a handle rod, the photographing portion being disposed on the handle rod; and a connection rod, the connection rod being a U-shaped rod, two ends of the connection rod being connected with the handle rod, so that the avoidance space being enclosed by the connection rod and the handle rod, at least one part of the photographing portion being positioned in the avoidance space, and the second end of the scooter rod portion being connected with a middle portion of the connection rod.

In an exemplary embodiment, the scooter rod portion includes: a first scooter rod and a second scooter rod, wherein the second scooter rod is telescopically disposed on the first scooter rod; one end, far away from the second scooter rod, of the first scooter rod is connected with the mounting frame; and one end, far away from the first scooter rod, of the second scooter rod is connected with the handle portion.

In an exemplary embodiment, the scooter is provided with a manned driving state and an unmanned driving state; the second scooter rod is provided with a contraction position and an extension portion; when the scooter is in the manned driving state, the second scooter rod is located at the extension portion, so that an operator operates the scooter rod portion to steer the wheel portion; and when the scooter is in the unmanned driving state, the second scooter rod is located at the contraction position, so that the wheel portion is driven by the driving portion to steer.

In an exemplary embodiment, a distance sensor is disposed on the first scooter rod and/or the second scooter rod so as to detect that the second scooter rod is in the contraction portion or the extension portion through the distance sensor; the driving portion is provided with a second driving portion for driving the wheel portion to steer; wherein the control portion is connected with the distance sensor, so that when the distance sensor detects that the second scooter rod is located at the contraction position, the control portion controls the second driving portion through the image signal collected by the photographing portion to act and thus the wheel portion is steered under a driving of the second portion; and when the distance sensor detects that the second scooter rod is located at the extension portion, the control portion controls the photographing portion and the second driving portion to stop work, so that the wheel portion is steered under an operation of the operator.

In an exemplary embodiment, the scooter further includes: an alarm portion, wherein the alarm portion is mounted on the scooter body; and the control portion is connected with the alarm portion, so that when the scooter is in the unmanned driving state, the control portion controls the alarm portion to send an alarm signal.

By applying some embodiments of the present disclosure, the avoidance space is disposed on the scooter body and the photographing portion is mounted on the scooter body, so that the view angle obstruction is prevented for the photographing portion through the avoidance space and the surrounding environment can be observed by the photographing portion at a larger angle.

BRIEF DESCRIPTION OF THE DRAWINGS

The accompanying drawings are described here to provide a further understanding of the present disclosure. The schematic embodiments and description of the present disclosure are adopted to explain the present disclosure, and do not form improper limits to the present disclosure. In the drawings.

Figure 1:
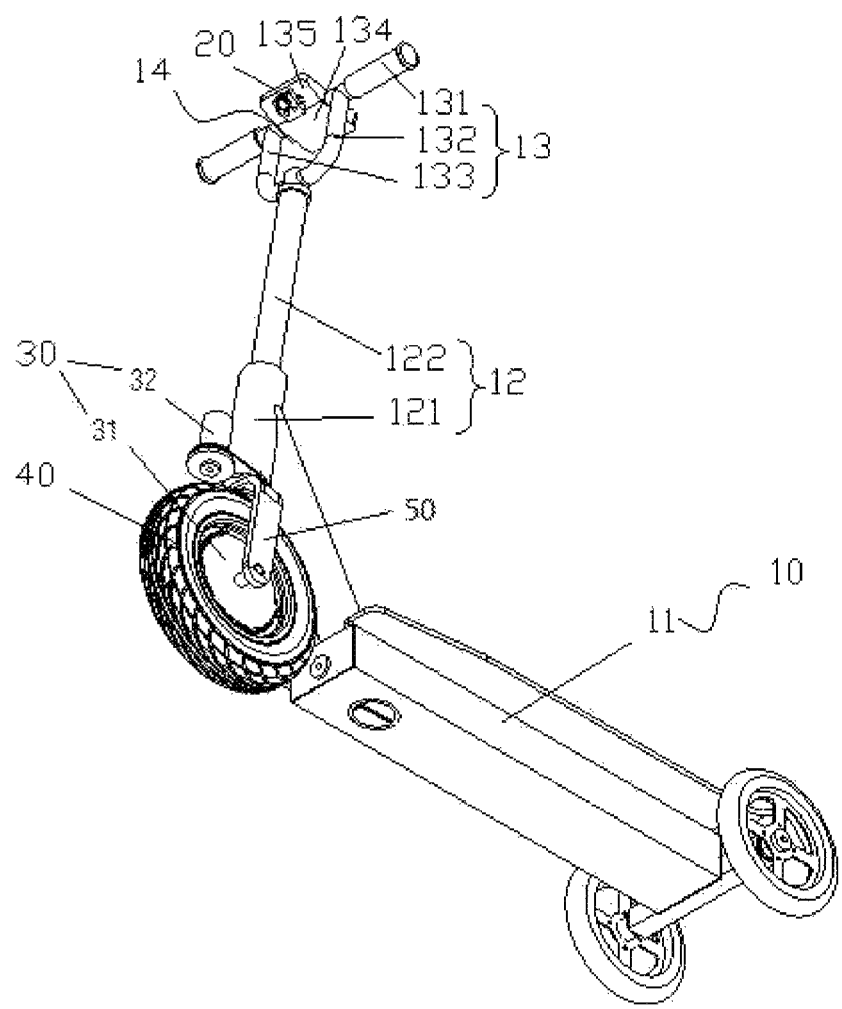
FIG. 1 illustrates a structural schematic diagram of a scooter according to an embodiment of the present disclosure.

Herein, the drawings include the following drawing markers:

10. scooter body; 11. sliding plate; 12. scooter rod portion; 121. first scooter portion; 122. second scooter portion; 13. handle portion; 131. handle rod; 132. first connection rod; 133. second connection rod; 134. mounting foundation; 135. mounting plane; 14. avoidance space;
  20. photographing portion;
  30. driving portion; 31. first driving portion; 32. second driving portion;
  40. wheel portion;
  50. mounting frame.

DETAILED DESCRIPTION OF THE EMBODIMENTS

It is to be noted that the embodiments of the present disclosure and the characteristics of the embodiments may be combined with each other if there is no conflict. The present disclosure will be described below in detail with reference to the accompanying drawings and in combination with the embodiments.

It is to be noted that the terms used herein are merely for describing the specific embodiments and are not intended to limit the exemplary embodiment of the present disclosure. As used herein, unless otherwise specified explicitly in the context, a singular form also includes a plural form. Additionally, it should be further understood that when terms such as "include", and "including" and/or "comprise" and "comprising" are used in the specification, it is indicated that a feature, a step, an operation, a device, a component and/or a combination thereof are present.

It is to be noted that, terminologies such as "first" and "second" in the specification, claims and accompanying drawings of the present disclosure are only used to distinguish similar objects, rather than to describe a special order or a precedence order. It should be understood that the terminologies used in such a way may be interchangeable in a certain cases, such that the embodiments of the present disclosure described here can be implemented in an order other than those illustrated or described here. In addition, the terms "comprises," "comprising," "includes," "including," "has," "having" or any other variation thereof are intended to cover a non-exclusive inclusion. For example, a process, method, article, or apparatus that comprises a list of steps or units is not necessarily limited to only those steps or units but may include other steps or units not expressly listed or inherent to such process, method, article, or apparatus.

For ease of description, spatial relative terms such as "over", "above", "on an upper surface" and "upper" may be used herein for describing a spatial position relation between a device or feature and other devices or features shown in the drawings. It will be appreciated that the spatial relative terms aim to contain different orientations in usage or operation besides the orientations of the devices described in the drawings. For example, if the devices in the drawings are inverted, devices described as "above other devices or structures" or "over other devices or structures" will be located as "below other devices or structures" or "under other devices or structures". Thus, an exemplar term "above" may include two orientations namely "above" and "below". The device may be located in other different modes (rotated by 90 degrees or located in other orientations), and spatial relative descriptions used herein are correspondingly explained.

Now, the exemplary embodiments according to the present disclosure are described in detail with reference to the drawings. However, the example embodiments may be implemented in multiple different modes, and are not intended to be limited by the described implementation modes herein. It is to be understood that the implementation modes are provided so that the present disclosure is completely and totally disclosed, and the conceptions of the example implementation modes are adequately transmitted to those of ordinarily skill in the art, in the drawings, for clarity, the thicknesses of layers and areas may be enlarged, and the same drawing mark is used for representing the same device, so that their description is omitted.

Figure 2:
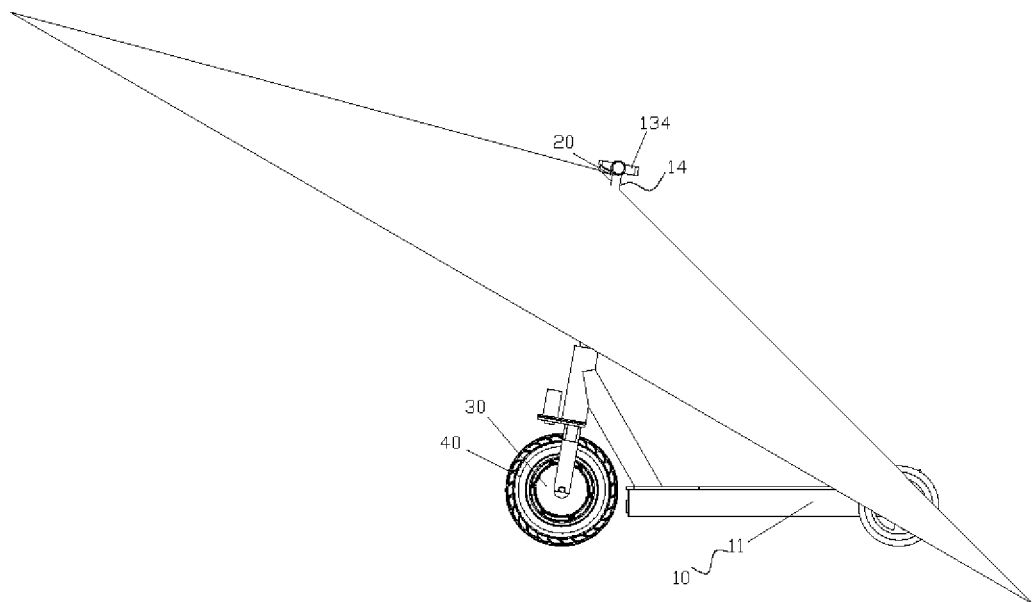
FIG. 2 illustrates a structural schematic diagram of a photographing view angle of a photographing portion of a scooter according to a first embodiment of the present disclosure.
Figure 3:
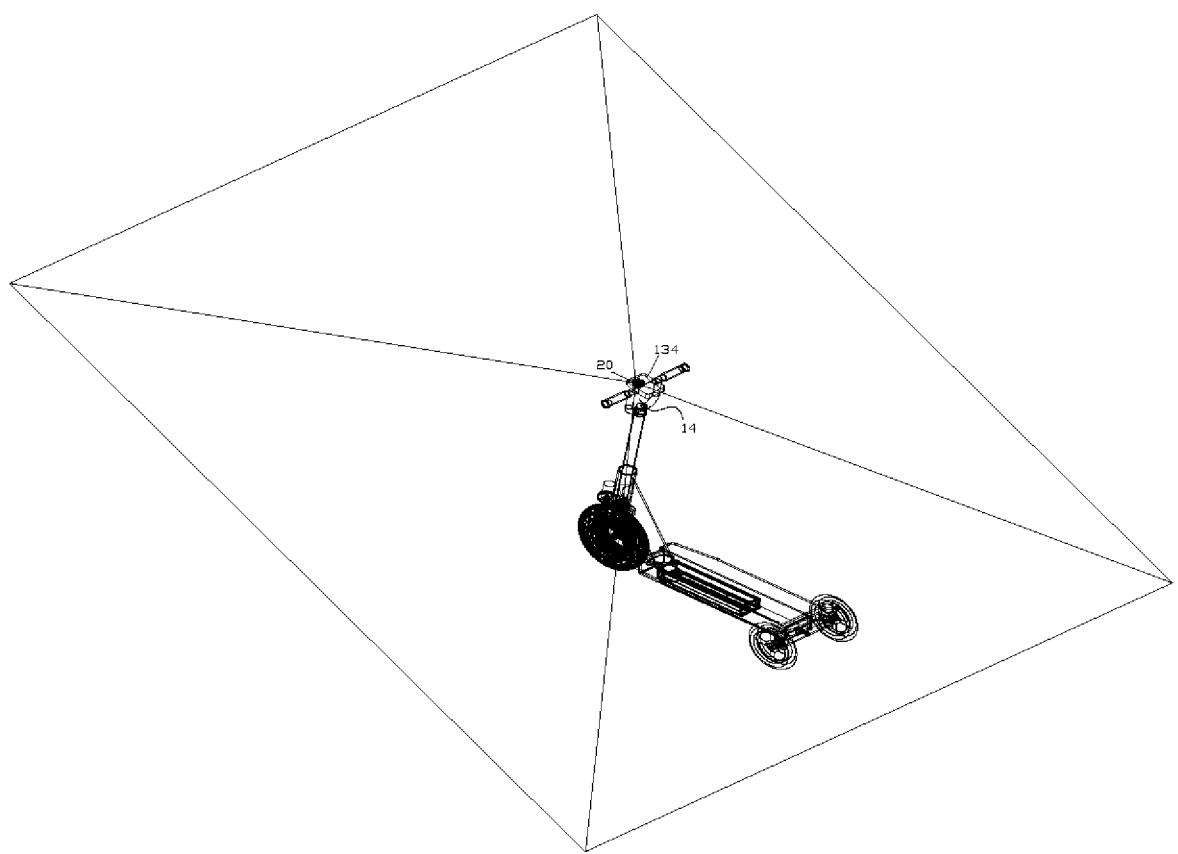
FIG. 3 illustrates a structural schematic diagram of a photographing view angle of a photographing portion of a scooter according to a second embodiment of the present disclosure.

As shown in FIG. 1 to FIG. 3, according to an embodiment of the present disclosure, there is provided a scooter.

In an exemplary embodiment, as shown in FIG. 1, the scooter includes a scooter body 10 and a photographing portion 20; the photographing portion 20 is mounted on the scooter body 10; and the scooter body 10 is provided with an avoidance space 14 for avoiding a photographing view angle of the photographing portion 20. With the avoidance space 14, when a camera is in unmanned navigation, a position at which an image needed to be collected most is not blocked; and the photographing portion 20 is mounted at a higher place of the scooter body as much as possible according to an actual demand, for example, may be disposed on a top of a scooter rod portion, so that a larger depression angle may be obtained.

The avoidance space is disposed on the scooter body and the photographing portion is mounted on the scooter body, so that the view angle obstruction is prevented for the photographing portion through the avoidance space and the surrounding environment can be observed by the photographing portion at a larger angle.

As shown in FIG. 1 and FIG. 2, the scooter further includes a driving portion 30, a wheel portion 40 and a control portion; the driving portion 30 is connected with the scooter body 10; at least part of wheel portion 40 is movably connected with the driving portion 30; the control portion is connected with the scooter body 10; the control portion is electrically connected with the photographing portion 20 and the driving portion 30; and the control portion controls the driving portion 30 through an image signal collected by the photographing portion 20 to act, thereby driving the at least part of the wheel portion 40 to drive the scooter body 10 to move and avoid an obstacle. In this way, the scooter in an unmanned state may photograph a surrounding environment through the photographing portion; and whether a path is hindered or not is judged by the control portion, so that the control portion drives the wheel portion and the scooter body walks on a road without an obstacle or a danger.

As shown in FIG. 2, the scooter body 10 includes a sliding plate 11, a scooter rod portion 12, and a handle portion 13; the scooter rod portion 12 is rotatablely connected with the sliding plate 11; a first end of the scooter rod portion 12 is connected with the driving portion 30; the handle portion 13 is connected with a second end of the scooter rod portion 12; the handle portion 13 is connected with the photographing portion 20; and the avoidance space 14 is formed between the handle portion 13 and the second end of the scooter rod portion 12. By forming the avoidance space 14 between the handle portion 13 and the second end of the scooter rod portion 12, the photographing portion 20 has an enough height to photograph and observe the periphery of the sliding plate, so as to judge whether an obstacle is present on the driving path or not.

As shown in FIG. 1 to FIG. 3, the handle portion 13 includes a handle rod 131, a first connection end 132 and a second connection rod 133; the handle rod 131 is connected with the photographing portion 20; a first end of the first connection rod 132 is connected with the handle rod 131, and a second end of the first connection rod 132 is connected with the second end of the scooter rod portion 12; a first end of the second connection rod 133 is connected with the handle rod 131, and a second end of the second connection rod 133 is connected with the second end of the scooter rod portion 12; the first end of the first connection rod 131 and the first end of the second connection rod 133 are provided at intervals; and the handle rod 131, the first connection rod 132 and the second connection rod 133 is enclosed to form the avoidance space 14. With such a manner, the photographing portion 20 is fixed by the handle rod 131 conveniently, the photographing portion 20 can observe a rear of the sliding plate 11 through the avoidance space, and the photographing view angle of the photographing portion at least includes a rear wheel portion of the wheel portion 40.

As shown in FIG. 1, the handle portion 13 further includes a mounting foundation 134, wherein the mounting foundation 134 is provided with a mounting plane 135; the mounting foundation 134 is connected with the handle rod 131 and is located between the first connection rod 132 and the second connection rod 133; the photographing portion 20 is detachably disposed on the mounting plane 135. With the mounting foundation 134, the photographing portion 20 is mounted conveniently.

The mounting plane 135 is disposed at a preset angle with a horizontal plane. The preset angle is 10°. With the preset angle, during the wide-angle photographing, the photographing portion 20 can observe a view angle in an advancing direction with the consideration to a view angle of a rear wheel, so that the driving safety of the scooter is improved.

In this embodiment, the photographing portion 20 is a wide-angle photographing device, and may be, for example, a single-fisheye wide-angle camera.

As shown in FIG. 1, the scooter rod portion 12 includes a first scooter rod 121 and a second scooter rod 122; a first end of the first scooter rod 121 is connected with the scooter body 10, and a second end of the first scooter rod 121 is provided with an opening; the opening extends along a length direction of the first scooter rod 121 to form an accommodation cavity; a first end of the second scooter rod 122 is movably disposed in the accommodation cavity, and a second end of the second scooter rod 122 is connected with the scooter handle portion 13; and the avoidance space 14 is formed between the scooter rod portion 12 and the second end of the second scooter body 122 and. In this way, when the scooter is in the unmanned driving state, by adjusting the positions of the first scooter rod 121 and the second scooter rod 122, a gravity center of the scooter is reduced and thus the driving stability of the scooter is improved.

In this embodiment, at least one of the first scooter rod 121 and the second scooter rod 122 is provided with a distance sensor; the distance sensor is electrically connected with the control portion; the second scooter rod 122 is provided with a contraction portion located in the accommodation cavity and an extension position located out of the accommodation cavity; when the distance sensor detects that the second scooter rod 122 is located at the contraction position, the control portion controls the driving portion 30 through the image signal collected by the photographing portion 20 to act; and when the distance sensor detects that the second scooter rod 122 is located at the extension portion, the control portion controls the photographing portion 20 to stop work. By providing the distance sensor to detect a relative distance between the first scooter rod 121 and the second scooter rod 122, whether the scooter is in the unmanned driving state or the manned driving state is judged; and when the scooter is in the unmanned driving state, the photographing portion is started to work.

In this embodiment, the scooter includes an alarm portion; the alarm portion is connected with the scooter body 10; and the alarm portion is electrically connected with the control portion. With such a manner, the scooter can alarm a pedestrian in the unmanned driving state. For example, a sound alarm is adopted in daytime and a light flash alarm is adopted in nighttime.

The scooter further includes a flexible portion; and the flexible portion is located between the photographing portion 20 and the mounting plane 135. The flexible portion may be a rubber pad. With the flexible portion, the photographing portion 20 is protected and thus the service life of the photographing portion 20 is improved.

The scooter of the present disclosure will be described below in more detail in combination with the accompanying drawings.

In an exemplary embodiment, as shown in FIG. 1, the scooter includes a scooter body 10 and a photographing portion 20; the photographing portion 20 is mounted on the scooter body 10; and the scooter body 10 is provided with an avoidance space 14 for avoiding a photographing view angle of the photographing portion 20. With the avoidance space 14, when a camera is in unmanned navigation, a position at which an image needed to be collected most is not blocked; and the photographing portion 20 is mounted at a higher place of the scooter body as much as possible according to an actual demand, for example, may be disposed on a top of a scooter rod portion, so that a larger depression angle may be obtained.

As shown in FIG. 1 and FIG. 2, the scooter further includes a driving portion 30; a wheel portion 40, the driving portion 30 being drivablely connected with the wheel portion 40, thereby driving the wheel portion 40 to rotate around an axial line of a wheel spindle of the wheel portion 40 and/or driving the wheel portion 40 to perform a steering motion; and a control portion, the control portion being connected with the scooter body 10, the control portion being electrically connected with the photographing portion 20 and the driving portion 30, and the control portion controlling the driving portion 30 through an image signal collected by the photographing portion 20 to act, thereby driving at least one part of wheel portion 40 to drive the scooter body 10 to move and avoid an obstacle.

As shown in FIG. 1, the driving portion 30 includes a first driving portion 31, wherein the first driving portion 31 is disposed an inner side of the wheel portion 40; and the first driving portion 31 is connected with the wheel spindle of the wheel portion 40, thereby driving the wheel portion 40 to rotate around the axial line of the wheel spindle.

As shown in FIG. 1, the scooter body 10 further includes a mounting frame 50; the wheel portion 40 is rotatablely mounted on the mounting frame 50; and the driving portion includes: a second driving portion 32, wherein the second driving portion 32 is in driving connection with the mounting frame 50 to drive the mounting frame 50 to rotate, so that the mounting frame 50 drives the wheel portion 40 to steer.

In an exemplary embodiment, the second driving portion 32 is provided with a driving wheel; a driven wheel is disposed on the mounting frame 50; and a transmission belt is provided on the driving wheel and the driven wheel in a sleeve manner, so that the driving wheel drives the driven wheel to rotate and thus the mounting frame 50 is rotated.

As shown in FIG. 2, the scooter body 10 includes a sliding plate 11; a scooter rod portion 12, the scooter rod portion 12 being rotatablely disposed relative to the sliding plate 11, and a first end of the scooter rod portion 12 being connected with the mounting frame 50, so that when the second driving portion 32 is in a nonworking state, the wheel portion 40 is steered by operating the scooter rod portion 12; and a handle portion 13, the handle portion 13 being connected with a second end of the scooter rod portion 12, and the photographing portion 20 being mounted on the handle portion 13.

As shown in FIG. 1 to FIG. 3, the handle portion 13 includes a handle rod 131, the photographing portion 20 being disposed on the handle rod 131; and a connection rod, the connection rod being a U-shaped rod, two ends of the connection rod being connected with the handle rod 131, so that the avoidance space (14) being enclosed by the connection rod and the handle rod 131, at least one part of the photographing portion 20 being positioned in the avoidance space 14, and the second end of the scooter rod portion 12 being connected with a middle portion of the connection rod.

As shown in FIG. 1, the handle portion 12 includes a first scooter rod 121 and a second scooter rod 122, wherein the second scooter rod 122 is telescopically disposed on the first scooter rod 121; one end, far away from the second scooter rod 122, of the first scooter rod 121 is connected with the mounting frame 50; and one end, far away from the first scooter rod 121, of the second scooter rod 122 is connected with the handle portion 13.

The scooter is provided with a manned driving state and an unmanned driving state; the second scooter rod 122 is provided with a contraction position and an extension portion; when the scooter is in the manned driving state, the second scooter rod 122 is located at the extension portion, so that an operator operates the scooter rod portion 12 to steer the wheel portion 40; and when the scooter is in the unmanned driving state, the second scooter rod 122 is located at the contraction position, so that the wheel portion 40 is driven by the driving portion 30 to steer.

In this embodiment, a distance sensor is disposed on the first scooter rod 121 and/or the second scooter rod 122 so as to detect that the second scooter rod 122 is in the contraction portion or the extension portion through the distance sensor; the driving portion 30 is provided with a second driving portion 32 for driving the wheel portion 40 to steer; wherein, the control portion is connected with the distance sensor, so that when the distance sensor detects that the second scooter rod 122 is located at the contraction position, the control portion controls the second driving portion 32 through the image signal collected by the photographing portion 20 to act and thus the wheel portion 40 is steered under a driving of the second portion 32; and when the distance sensor detects that the second scooter rod 122 is located at the extension portion, the control portion controls the photographing portion 20 and the second driving portion 32 to stop work, so that the wheel portion 40 is steered under an operation of the operator.

In this embodiment, the scooter further includes an alarm portion, wherein the alarm portion is mounted on the scooter body 10; and the control portion is connected with the alarm portion, so that when the scooter is in the unmanned driving state, the control portion controls the alarm portion to send an alarm signal.

Besides, reference throughout this specification to "one embodiment", "another embodiment", "embodiments" or the like means that one or more particular features, structures, or characteristics described in connection with an embodiment are included in at least one embodiment of the present disclosure. However, such recitations do not necessarily mean that all embodiments include the particular features, structures, and/or characteristics. Additionally, when particular features, structures, and/or characteristics are described in connection with one embodiment, it should be understood that such features, structures, and/or characteristics may also be implemented in connection with other embodiments.

In the above embodiments, the description on each embodiment has its preference. The part not detailed in one embodiment may be referred to related description in other embodiments.

The above are only preferred embodiments of the present disclosure not intended to limit the present disclosure. As will occur to those skilled in the art, the present disclosure is susceptible to various modifications and changes. Any modifications, equivalent replacements, improvements and the like made within the spirit and principle of the present disclosure shall fall within the scope of protection of the present disclosure.

What is claimed is:

1. A scooter, comprising:
   a scooter body; and
   a photographing portion, wherein the photographing portion is mounted on the scooter body; and the scooter body is provided with an avoidance space for avoiding a photographing view angle of the photographing portion, so that the photographing portion photographs a road condition around the scooter body;
   a driving portion, the driving portion being connected with the scooter body;
   a wheel portion, at least part of the wheel portion being movably connected with the driving portion; and
   a control portion, the control portion being connected with the scooter body, the control portion being electrically connected with the photographing portion and the driving portion, and the control portion controlling the driving portion (30) through an image signal collected by the photographing portion to act, thereby driving the at least part of the wheel portion to drive the scooter body to move and avoid an obstacle;
   wherein the scooter body comprises:
   a sliding plate;
   a scooter rod portion, the scooter rod portion being rotatablely connected with the sliding plate, and a first end of the scooter rod portion being connected with the driving portion; and
   a handle portion, the handle portion being connected with a second end of the scooter rod portion, the handle portion being connected with the photographing portion, and the avoidance space being formed between the handle portion and the second end of the scooter rod portion;
   wherein the scooter rod portion comprises:
   a first scooter rod and a second scooter rod, wherein the second scooter rod is telescopically disposed on the first scooter rod; one end, far away from the second scooter rod, of the first scooter rod is connected with the mounting frame; and one end, far away from the first scooter rod, of the second scooter rod is connected with the handle portion;
   wherein, the scooter is provided with a manned driving state and an unmanned driving state; the second scooter rod is provided with a contraction position and an extension portion; when the scooter is in the manned driving state, the second scooter rod is located at the extension portion, so that an operator operates the scooter rod portion to steer the wheel portion; and when the scooter is in the unmanned driving state, the second scooter rod is located at the contraction position, so that the wheel portion is driven by the driving portion to steer.

2. The scooter as claimed in claim 1, wherein the handle portion comprises:
   a handle rod, the handle rod being connected with the photographing portion;
   a first connection end, a first end of the first connection rod being connected with the handle rod, and a second end of the first connection rod being connected with the second end of the scooter rod portion; and
   a second connection rod, a first end of the second connection rod being connected with the handle rod, a second end of the second connection rod being connected with the second end of the scooter rod portion, the first end of the first connection rod and the first end of the second connection rod being provided at intervals, and the handle rod, the first connection rod and the second connection rod being enclosed to form the avoidance space.

3. The scooter as claimed in claim 2, wherein the handle portion further comprises:
   a mounting foundation, wherein the mounting foundation is provided with a mounting plane; the mounting foundation is connected with the handle rod and is located between the first connection rod and the second connection rod; and the photographing portion is detachably disposed on the mounting plane.

4. The scooter as claimed in claim 3, wherein the mounting plane is disposed at a preset angle with a horizontal plane.

5. The scooter as claimed in claim 3, wherein the photographing portion is a wide-angle photographing device.

6. The scooter as claimed in claim 1, wherein
   a first end of the first scooter rod is connected with the scooter body, a second end of the first scooter rod is provided with an opening, and the opening extends along a length direction of the first scooter rod to form an accommodation cavity; and a first end of the second scooter rod is movably disposed in the accommodation cavity, a second end of the second scooter rod is connected with the scooter handle portion, and the avoidance space is formed between the scooter rod portion and the second end of the second scooter rod.

7. The scooter as claimed in claim 6, wherein at least one of the first scooter rod and the second scooter rod is provided with a distance sensor; the distance sensor is electrically connected with the control portion; the second scooter rod is provided with a contraction portion located in the accommodation cavity and an extension position located out of the accommodation cavity; when the distance sensor detects that the second scooter rod is located at the contraction position, the control portion controls the driving portion through the image signal collected by the photographing portion to act; and when the distance sensor detects that the second scooter rod is located at the extension portion, the control portion controls the photographing portion to stop work.

8. The scooter as claimed in claim 1, wherein the scooter further comprises:
an alarm portion, wherein the alarm portion is connected with the scooter body; and the alarm portion is electrically connected with the control portion.

9. The scooter as claimed in claim 1, wherein
the driving portion is drivablely connected with the wheel portion, thereby driving the wheel portion to rotate around an axial line of a wheel spindle of the wheel portion and/or driving the wheel portion to perform a steering motion.

10. The scooter as claimed in claim 9, wherein the driving portion comprises:
a first driving portion, wherein the first driving portion is disposed an inner side of the wheel portion; and the first driving portion is connected with the wheel spindle of the wheel portion, thereby driving the wheel portion to rotate around the axial line of the wheel spindle.

11. The scooter as claimed in claim 9, wherein the scooter body further comprises a mounting frame; the wheel portion is rotatablely mounted on the mounting frame; and the driving portion comprises:
a second driving portion, wherein the second driving portion is in driving connection with the mounting frame to drive the mounting frame to rotate, so that the mounting frame drives the wheel portion to steer.

12. The scooter as claimed in claim 11, wherein the second driving portion is provided with a driving wheel; a driven wheel is disposed on the mounting frame; and a transmission belt is provided on the driving wheel and the driven wheel in a sleeve manner, so that the driving wheel drives the driven wheel to rotate and thus the mounting frame is rotated.

13. The scooter as claimed in claim 11, wherein
a first end of the scooter rod portion is connected with the mounting frame, so that when the second driving portion is in a nonworking state, the wheel portion is steered by operating the scooter rod portion; and
the photographing portion is mounted on the handle portion.

14. The scooter as claimed in claim 13, wherein the handle portion comprises:
a handle rod, the photographing portion being disposed on the handle rod; and
a connection rod, the connection rod being a U-shaped rod, two ends of the connection rod being connected with the handle rod, so that the avoidance space being enclosed by the connection rod and the handle rod, at least part of the photographing portion being positioned in the avoidance space, and the second end of the scooter rod portion being connected with a middle portion of the connection rod.

15. The scooter as claimed in claim 13, wherein
a distance sensor is disposed on the first scooter rod and/or the second scooter rod so as to detect that the second scooter rod is in the contraction portion or the extension portion through the distance sensor;
the driving portion is provided with a second driving portion for driving the wheel portion to steer;
wherein, the control portion is connected with the distance sensor, so that when the distance sensor detects that the second scooter rod is located at the contraction position, the control portion controls the second driving portion through the image signal collected by the photographing portion to act and thus the wheel portion is steered under a driving of the second portion; and when the distance sensor detects that the second scooter rod is located at the extension portion, the control portion controls the photographing portion and the second driving portion to stop work, so that the wheel portion is steered under an operation of the operator.

16. The scooter as claimed in claim 15, wherein the scooter further comprises:
an alarm portion, wherein the alarm portion is mounted on the scooter body; and the control portion is connected with the alarm portion, so that when the scooter is in the unmanned driving state, the control portion controls the alarm portion to send an alarm signal.

* * * * *